United States Patent [19]

Burton

[11] 4,257,893

[45] Mar. 24, 1981

[54] PORTABLE PURIFICATION DEVICE FOR USE IN AQUARIUMS

[76] Inventor: Todd J. Burton, 147½ Seibert Rd., Pittsburgh, Pa. 15237

[21] Appl. No.: 27,079

[22] Filed: Apr. 4, 1979

[51] Int. Cl.³ .......................................... E04H 3/20
[52] U.S. Cl. ................................................. 210/169
[58] Field of Search .............................. 210/169; 119/5

[56] References Cited

U.S. PATENT DOCUMENTS

| | | | |
|---|---|---|---|
| 1,055,082 | 3/1913 | Rogers | 210/169 |
| 2,765,275 | 10/1956 | Aaron | 210/169 |
| 3,006,476 | 10/1961 | Halpert | 210/169 |
| 3,151,069 | 9/1964 | Halpert | 210/169 |
| 3,390,665 | 7/1968 | Wininger | 210/169 |
| 3,477,580 | 11/1969 | Willinger | 210/169 |
| 3,483,985 | 12/1969 | Axelrod | 210/169 |
| 3,734,853 | 5/1973 | Horrath | 210/169 |
| 3,994,811 | 11/1976 | Cohen et al. | 210/169 |

*Primary Examiner*—Theodore A. Granger
*Attorney, Agent, or Firm*—Paul J. Sutton

[57] ABSTRACT

A portable purification device for use in cleaning aquarium tank bottoms is disclosed comprising a tube column where compressed air is discharged stimulating a constant flow of water within a lower connected filter chamber housing polyester fiber filtering material for entrapping large and small particle impurities that are drawn in through a lowerly extending pickup tube section.

1 Claim, 2 Drawing Figures

PORTABLE PURIFICATION DEVICE FOR USE IN AQUARIUMS

BACKGROUND OF THE INVENTION

This invention relates to a portable filtering and aerating device which is particularly suited for removing accumulated particle impurities found within aquatic enviroments and particle beds of aquarium tanks.

It is known to be a general requirement to filter aquarium water in order to sustain a healthy enviroment for the aquatic life contained therewith. It is equally important however, to frequently clean and maintain bottom surfaces and bed gravel as they too are part of a fishes enviroment and in time if not properly maintained will ultimatly damage the health of the fish and other aquatic life as well.

Prior art devices designed for cleaning aquarium tank bottoms reveal certain dificulties overcome by the present invention.

One example of prior art shown in Aaron U.S. Pat. No. 2,765,275 reveals a device which relied upon the releasing of trapped air from within the submerged unit through a tube extending above the waters surface by lifting ones thumb from it, as a means for stimulating a momentary water flow for cleaning. A device prepared according to the above invention would result in a momentary operating, nonaerating device suitable for cleaning only very small areas of an aquarium bottom. Removing an occasional undesirable substance such as a decaying plant leaf or the like. It would be unsuitable for cleaning an entire aquarium tank bottom.

Other devices generally use porous bag type filters which entrap larger dirt particles but permit smallar more threatening micro size aqutic life forms to return back into the aquarium water where they usually already are, in an overabundant state.

A desirable object of this invention would be to provide a portable purification device for removing dirt and other impurities from both, bottom surfaces and subsurface particle beds of aquarium tanks.

Another object of this invention is to provide a portable purification device which filters as well as aerates aquarium water with a constant flow cleaning action for improved water conditions in aquarium tanks.

Still another object of this invention is to provide a portable purification device that is of simple low cost design, easy to operate yet extremely efficient in performing its suited duties in cleaning aquarium tank bottoms.

Other objects, advantages and better understanding will become apparent from the following descriptions and illistrations.

SUMMARY

The above objects are accomplished by providing a device which is wholly portable, being constructed of durable plastic and operating with a continuous cleaning action on compressed air supplied from a conventional aquarium air pump, thus drawing in dirt particles only and leaving bed gravel thoroughly cleaned on the bottom. It also utilizes readily obtainable polyester fiber floss being an inexpensive highly efficient filtering material which entraps both large and small impurities when used in aquarium filtration.

DETAILED DESCRIPTION OF THE PREFERRED EMBODIMENT

Figure 1:
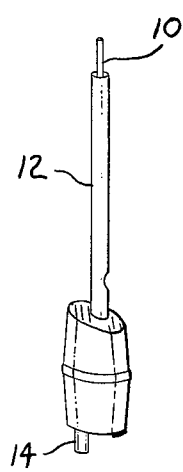
FIG. 1 is a perspective view of a portable purification device made according to the invention.
Figure 2:
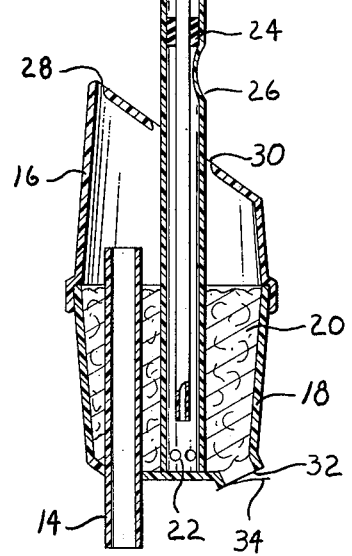
FIG. 2 is a sectional side view of the invention.

In the drawings FIGS. 1 and 2, a portable aquarium cleaning device prepared according to the invention is shown having an air feed tube member 10 where air supplied from a conventional aquarium type air pump and hose is connected pumping air down into the lower end of an outer surrounding tube column 12.

Assuming that the device is already submerged and filled with water, air bubbles expelled from tube member 10 stimulate a constant water flow by rising upwardly inside column 12. Water is thus drawn through a lowerly extending pickup tube section 14 into a filter chamber comprizing an upper removable female top half 16 and a lower male bottom half 18, which is integrally formed with pickup tube 14 and the lower most end of tube column 12. Water exits the pickup tube inside the filter chamber above the polyester fiber filter material 20. It then passes through the filter material which entraps both large and small particle impurities, entering next into the tube column through lower inlet apertures 22 where the water then mixes with air bubbles rising up the column. A diverting means rubber plug 24 also serving to secure the air feed tube 10 inside column 12, forces the air water flow out an outlet aperture 26 located directly below, returning filtered clean aerated, water in a continuous mode back into the aquarium tank.

A slit or aperture air escape means 28, is provided at the uppermost side of the slant roofed filter chamber top half 16 to permit the escape of trapped air from within as the unit is submerged in aquarium water. It is also provided with a top center located circular aperture 30 of a diameter which permits it to easily slide up and down the tube column 12 for changing the filter material 20 when needed. To open the chamber pressure is applied in an upward motion until the top female half snaps up and slides up the tube column. For closing the chamber the top female half slides down and snapfits over the male bottom half.

An escape valve means is prepared on the bottom side of the filter chamber male bottom half 18 providing means for water to escape the device when lifted out of the aquarium water after usage. It includes an aperture 32 through which the escaping water passes, opening a provided flexible plastic valve lip 34. The valve lip is held closed being substantially resilient while the device is in operation. It is generally a bit larger than the escape aperture and is fastened to an edge of it by its edge.

The device is manipulated within an aquarium tank by grasping the upper end of the tube column 12 which extends above the waters surface a suitable distance serving as a convenient handle means. While in operation the device is positioned within the tank so that the pickup tube 14 is close to the bottoms surface, thus it is panned slowly in a back and forth motion picking up various particle impurities until the entire bottom surface has been cleaned. Fairly large undesirable objects such as a decaying plant leaf or vacant snail shell can also be removed, provided they are not too big or heavy to be drawn into the pickup tube.

Tube extensions or other attachements if desired may be connected on pickup tube section 14 permitting the device to be used in deeper tanks or perform other related duties in cleaning aquarium tanks, thus furthering the devices utility.

The entire device may be formed from inexpensive synthetic resins which are suitable for use in aquarium tanks.

The above invention has been described as one preferred embodiment, while other variations thereof are deemed to be covered and protected by this patent application.

I claim:

1. A portable purification apparatus for use in an aquarium tank, or the like, comprising: a housing defining a substantially closed filter chamber with a water tube column extending from a bottom portion of said chamber through an opening in a top portion thereof, said water tube having a first opening located in the bottom portion of said chamber and a second open end located above the top of the housing portions defining said chamber, means for discharging compressed air within said tube column at a point relatively near said first opening end thereof, a pickup tube having one receiving opening disposed beneath the bottom portion of said chamber and a second opening located within said chamber in an upper portion thereof, air outlet means in the top of said chamber and a water discharge outlet in a lower portion of the housing defining said chamber, polyester type filtering material located within said chamber between said water tube first opening and said second water tube opening, and filter chamber removable means for facilitating replacement of the filter material in said filter chamber.

* * * * *